United States Patent [19]
Okazaki

[11] Patent Number: 5,875,174
[45] Date of Patent: Feb. 23, 1999

[54] TIME-DIVISION MULTIPLEX COMMUNICATION CONTROL CIRCUIT FOR ATM TERMINAL

[75] Inventor: Fumihiro Okazaki, Tokyo, Japan

[73] Assignee: NEC Corporation, Japan

[21] Appl. No.: 771,381

[22] Filed: Dec. 16, 1996

[30] Foreign Application Priority Data

Dec. 22, 1995 [JP] Japan .................................... 7-334688

[51] Int. Cl.⁶ ................................................ H04L 12/56
[52] U.S. Cl. ........................ 370/230; 370/397; 370/399
[58] Field of Search ................................. 370/230, 397, 370/399, 412, 428, 424, 235, 389, 417

[56] References Cited

U.S. PATENT DOCUMENTS

| | | | |
|---|---|---|---|
| 5,050,161 | 9/1991 | Golestani | 370/60 |
| 5,084,867 | 1/1992 | Tachibana et al. | 370/60 |
| 5,253,247 | 10/1993 | Hirose et al. | 370/14 |
| 5,323,389 | 6/1994 | Bitz et al. | 370/60.1 |
| 5,408,461 | 4/1995 | Urin et al. | 370/14 |
| 5,440,552 | 8/1995 | Sugita | 370/60 |
| 5,444,706 | 8/1995 | Osaki | 370/94.1 |
| 5,467,349 | 11/1995 | Huey et al. | 370/60.1 |
| 5,509,001 | 4/1996 | Tachibana et al. | 370/17 |
| 5,583,863 | 12/1996 | Darr, Jr. et al. | 370/17 |
| 5,694,554 | 12/1997 | Kawabata et al. | 395/250 |

FOREIGN PATENT DOCUMENTS

| | | |
|---|---|---|
| 5-14399 | 1/1993 | Japan . |
| 5-95367 | 4/1993 | Japan . |
| 5-114912 | 5/1993 | Japan . |
| 5-252176 | 9/1993 | Japan . |

*Primary Examiner*—Melvin Marcelo
*Assistant Examiner*—Alexander Boakye
*Attorney, Agent, or Firm*—Ostrolenk, Faber, Gerb & Soffen, LLP

[57] ABSTRACT

Information generated by a terminal is delivered to an ATM transmission circuit, which assembles a cell from the information and inserts the cell into a transmission cell stream. An unassigned cell and an idle cell that do not contain information to be actually transmitted are removed from the transmission cell stream by an ineffective cell removing circuit. Only a cell which contains information to be actually transmitted is held by a FIFO memory until a transmission time. The reception by an ATM reception circuit of a cell representing a reference time is detected by a received VPI/VCI detecting circuit. The time at which to output the transmission cell from the FIFO memory to a circuit line is determined by a timer with respect to the reference time. In response to the determined time, a transmission control circuit reads the transmission cell from the FIFO memory, and delivers the transmission cell to the circuit line.

4 Claims, 3 Drawing Sheets

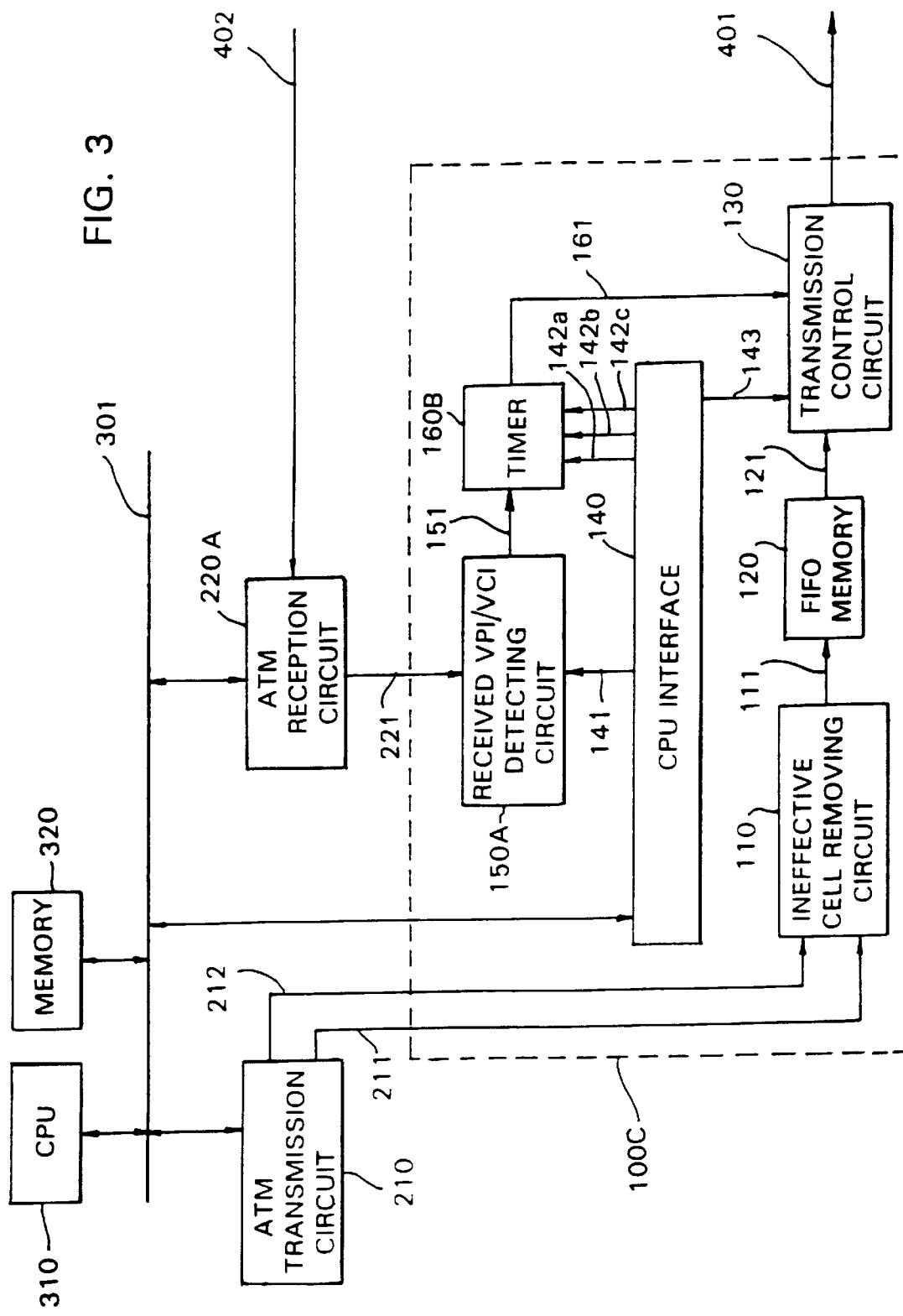

TIME-DIVISION MULTIPLEX COMMUNICATION CONTROL CIRCUIT FOR ATM TERMINAL

BACKGROUND OF THE INVENTION

1. Field of the Invention

The present invention relates to a time-division multiplex communication control circuit for an ATM (Asynchronous Transfer Mode) terminal, and more particularly to a time-division multiplex communication control circuit for an ATM terminal which carries out time-division multiplex communications in a network which has no multiplexer on a circuit line.

2. Description of the Related Art

For effecting time-division multiplex communications between a plurality of terminals in a network with ATM, it is necessary to multiplex information generated by the terminals according to a time-division multiplex process in order to transmit the information over a single circuit line.

Time-division multiplex communication control circuits for controlling such time-division multiplex communications are used to transmit the multiplexed information from the terminals over the single circuit line. Conventional time-division multiplex communication control circuits require that a multiplexer be provided on the circuit line.

For example, Japanese Patent Laid-Open No. 114912/93 discloses a time-division multiplex communication control technique for synchronizing information generated by a plurality of mediums in a system which has a multiplexer on a circuit line.

Since the multiplexer needs to be provided on the circuit line, the conventional time-division multiplex communication control circuits cannot use a circuit line of a network which has no multiplexer on the circuit line, such as a circuit line of an existing CATV (CAble TeleVision) network, directly as an ATM circuit line, or use such a circuit line as both an ATM circuit line and a circuit line for originally intended use.

The reasons for the above problem are as follows: A plurality of terminals of a network operate independently of each other and generate their own items of information out of synchronism with each other. The items of information generated by the respective terminals overlap each other in time. If the overlapping items of information were transmitted over the circuit line without being multiplexed, then they would conflict each other on the circuit line.

SUMMARY OF THE INVENTION

It is therefore an object of the present invention to provide a time-division multiplex communication control circuit for an ATM terminal which carries out time-division multiplex communications with ATM in a network which has no multiplexer on a circuit line, such as an existing CATV network.

To achieve the above object, there is provided in accordance with the present invention a time-division multiplex communication control circuit for an ATM terminal of an ATM network system which is periodically supplied with a cell of a predetermined VPI/VCI through a reception line from a network host, comprising received VPI/VCI detecting means for detecting the reception of the cell by an ATM reception circuit and outputting a VPI/VCI detected signal, timer means for measuring time from a reference time which represents a time at which the VPI/VCI detected signal is received and outputting a transmitting start signal upon elapse of a predetermined time or a plurality of predetermined times, ineffective cell removing means for removing an unassigned cell and an idle cell from a transmission cell stream outputted from an ATM transmission circuit and outputting only an effective cell, FIFO memory means for holding the effective cell outputted from the ineffective cell removing means, and transmission control means for reading the cell from the FIFO memory means and outputting the cell to a transmission line in response to the transmitting start signal.

A cell of a predetermined VPI/VCI which is generated by a network host and periodically transmitted therefrom over a reception line is received by the ATM reception circuit. The reception of the cell by the ATM reception circuit is detected by the received VPI/VCI detecting means. Using the time at which the reception of the cell is detected as a reference time, the timer means determines a time to output a transmission cell carrying information generated by the terminal to the transmission line. The determined time allows the terminal to output the transmission cell to the circuit line in synchronism with the network host. If each of all terminals connected to the network system is associated with the time-division multiplex communication control circuit according to the present invention, then times for the respective terminals to output transmission cells to the circuit line can be selected without overlapping each other in time. Therefore, the time-division multiplex communication control circuit allows a circuit line which has no multiplexer, such as an existing CATV circuit line, to carry out time-division multiplex communications.

The reception by the ATM reception circuit of a cell of a predetermined VPI/VCI is detected by a hardware arrangement with respect to the reference time representing the time to output a transmission cell carrying information generated by the terminal to the transmission line, and a wait time from the reference time indicative of the detection of the reception of the cell until a transmission time for a time slot to which the terminal is assigned is measured by the timer means which is hardware-implemented. Therefore, the time-division multiplex communication control circuit is not affected by a large software burden and the availability of a CPU bus of the terminal which would otherwise pose a problem if the detection of the reception of the cell and the measurement of the wait time were carried out by a software-implemented approach. Since variations of the period at which to detect the reception of the cell indicative of the reference time and errors of the measurement of the wait time are small, a guard time, i.e., a time in which any terminals transmit no cells, inserted to avoid a conflict between transmission cells in a certain time slot and a next time slot may be shortened for an increased effective communication rate.

The transmission cell is held by the FIFO memory means from the time at which it is generated until the time at which it is transmitted. Consequently, no software consideration needs to be given to the time to transmit the cell, and the cell can be transmitted at the time the information is generated. As a result, a software burden may be reduced, and the CPU may be utilized efficiently.

Ineffective cells, i.e., an unassigned cell and an idle cell that do not contain information to be actually transmitted are removed from the transmission cell stream outputted from the ATM transmission circuit by the ineffective cell removing means, and only an effective cell (a cell that contains information to be actually transmitted) is written into the FIFO memory means. Thus, the capacity of the FIFO memory means may be reduced. For the same reason, since no ineffective cells are transmitted to the transmission line, the effective communication rate may be increased.

The received VPI/VCI detecting means may comprise comparing means for comparing the value of a VPI/VCI in the header of the received cell with the value of a VPI/VCI to be detected, and outputting the VPI/VCI detected signal when the compared values agree with each other.

Alternatively, the ATM reception circuit may comprise means for referring to an external reception lookup table upon reception of cells, and the received VPI/VCI detecting means may comprise comparing means for comparing an address of the reception lookup table which corresponds to the value of a VPI/VCI of the received cell with an address of the reception lookup table which corresponds to the value of a VPI/VCI to be detected, and outputting the VPI/VCI detected signal when the compared addresses agree with each other.

The value of a VPI/VCI to be detected by the received VPI/VCI detecting means and a wait time until the timer means outputs the transmission start signal in response to the VPI/VCI detected signal, may be software-established by a CPU through a CPU interface.

The above and other objects, features, and advantages of the present invention will become apparent from the following description with references to the accompanying drawings which illustrate examples of the present invention.

BRIEF DESCRIPTION OF THE DRAWINGS

FIG. 3 is a block diagram of a time-division multiplex communication control circuit for an ATM terminal according to a third embodiment of the present invention.

DETAILED DESCRIPTION OF THE PREFERRED EMBODIMENTS

Figure 1:
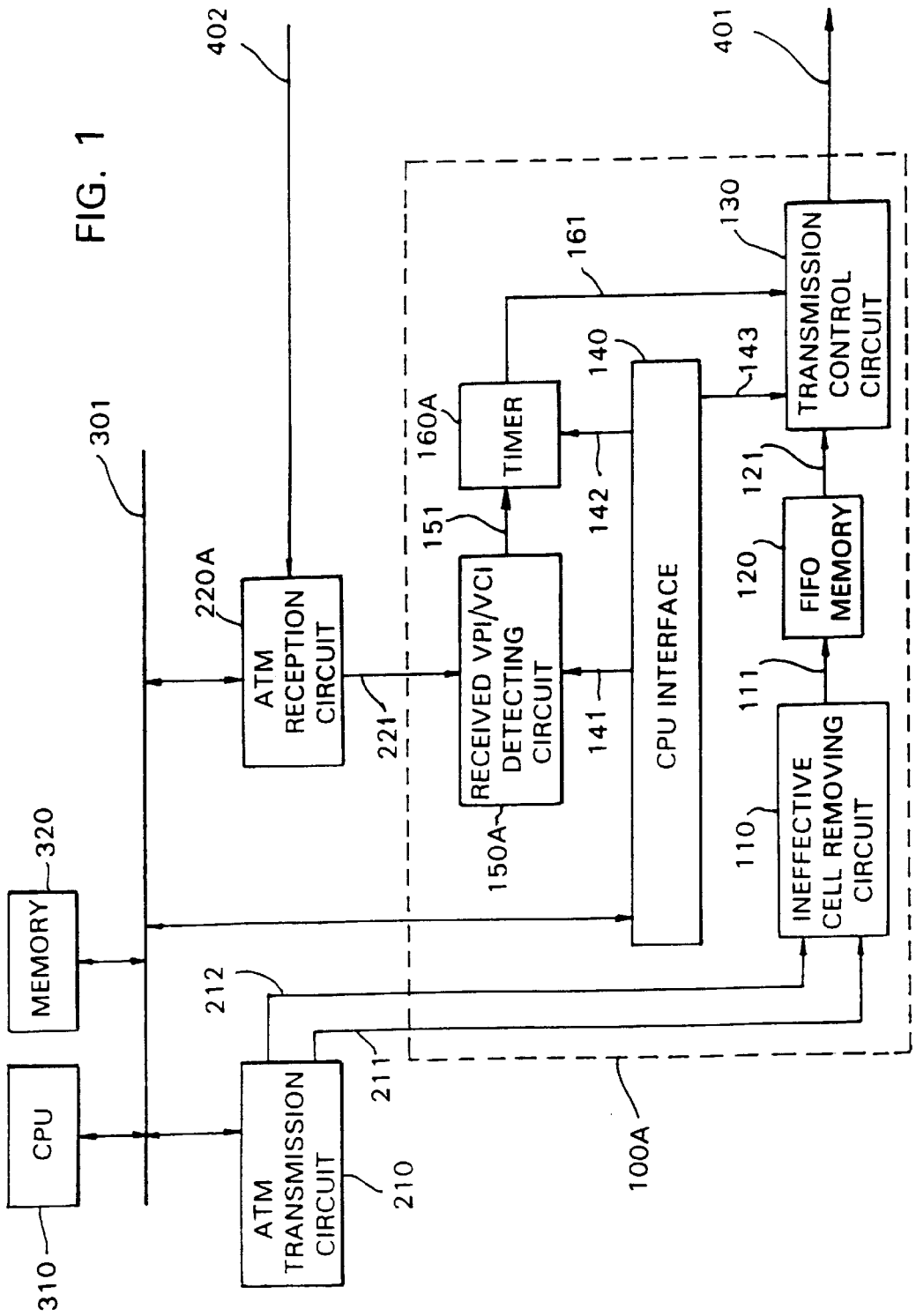
FIG. 1 is a block diagram of a time-division multiplex communication control circuit for an ATM terminal according to a first embodiment of the present invention.

Like or corresponding parts are denoted by like or corresponding reference characters throughout views.

As shown in FIG. 1, a time-division multiplex communication control circuit 100A for an ATM terminal according to a first embodiment of the present invention comprises an ineffective cell removing circuit 110 as an ineffective cell removing means, an FIFO (First-In, First-Out) memory 120 as an FIFO memory means, a transmission control circuit 130 as a transmission control means, a CPU (Central Processing Unit) interface 140, a received VPI/VCI (Virtual Path Identifier/Virtual Channel Identifier) detecting circuit 150A as a received VPI/VCI detecting means, and a timer 160A as a timer means.

The ineffective cell removing circuit 110 is connected to an ATM transmission circuit 210 and outputs effective cells 111 in a transmission cell stream 212 to the FIFO memory 120.

The FIFO memory 120 is connected to the ineffective cell removing circuit 110, and holds the supplied effective cells 111 until a time to transmit them.

The received VPI/VCI detecting circuit 150A is connected to an ATM reception circuit 220A and the CPU interface 140, and detects the reception by the ATM reception circuit 220A of a preset VPI/VCI cell and outputs a VPI/VCI detected signal 151 to the timer 160A.

The timer 160A is connected to the received VPI/VCI detecting circuit 150A and the CPU interface 140. When the timer 160A is supplied with the VPI/VCI detected signal 151, it outputs a transmission start signal 161 to the transmission control circuit 130 after elapse of a predetermined time.

The transmission control circuit 130 is connected to the FIFO memory 120, the timer 160A, and the CPU interface 140. When the transmission control circuit 130 is supplied with the transmission start signal 161 from the timer 160A, it reads a transmission cell 121 from the FIFO memory 120 and outputs the transmission cell 121 to a transmission line 401 insofar as a cell exists in the FIFO memory 120 and the transmission of a cell is permitted.

The CPU interface 140 is connected to a CPU bus 310 of a terminal which comprises a CPU 310, a memory 320, the ATM reception circuit 220A, and the CPU bus 310. The CPU interface 140 delivers settings 141, 142, 143 from the CPU 310 respectively to the received VPI/VCI detecting circuit 150A, the timer 160A, and the transmission control circuit 130.

Operation of the time-division multiplex communication control circuit 100A will be described below.

In this embodiment, a predetermined VPI/VCI cell (hereinafter referred to as a "frame synchronizing cell") at the start of each frame which comprises a plurality of given time slots is transmitted from a network host over a reception line 402 as a reference time for a time-division multiplex process.

First, the CPU 310 of the terminal establishes, through the CPU interface 140, a VPI/VCI (VPI/VCI of a reception cell to be detected) 141 of a frame synchronizing cell in the received VPI/VCI detecting circuit 150A, a wait time 142 from a reference time (a time when the reception of a frame synchronizing cell by the ATM reception circuit 220A is detected) until a time to transmit a time slot assigned to the terminal of its own, in the timer 160A, and a setting 143 for permitting/inhibiting a transmission cycle in the transmission control circuit 130.

Information generated by the terminal is delivered through the CPU bus 301 to the ATM transmission circuit 210, which assembles a cell from the information and inserts the cell into the transmission cell stream 212 that is outputted to the ineffective cell removing circuit 110.

The ATM transmission circuit 210 also supplies a transmission cell identification signal 211 to the ineffective cell removing circuit 110, indicating whether an effective cell containing information to be actually transmitted or an ineffective cell (an unassigned cell or an idle cell) not containing information to be actually transmitted is being presently outputted as the transmission cell stream 212 from the ATM transmission circuit 210.

The ineffective cell removing circuit 110 writes the transmission cell stream 212 as an effective cell 111 into the FIFO memory 120 only during a period in which the transmission cell identification signal 211 indicates that an effective cell is being outputted from the ATM transmission circuit 210. The ineffective cell removing circuit 110 may comprise a gate circuit for masking, with the transmission cell identification signal 211, a transmission data clock signal used as a writing clock signal for the FIFO memory 120.

The FIFO memory 120 holds the written effective cell until it is read at a transmission time for a time slot assigned to its own terminal.

The received VPI/VCI detecting circuit 150A compares a VPI/VCI 221 of a cell received by the ATM reception circuit 220A with the preset VPI/VCI 141 of a frame synchronizing cell. When the compared VPI/VCIs 221, 141 agree with each other, the received VPI/VCI detecting circuit 150A outputs a VPI/VCI detected signal 151. The received VPI/VCI detecting circuit 150A may comprise a comparator.

The timer 160A is initially inactive. When supplied with the VPI/VCI detected signal 151, the timer 160A starts measuring time. When a time equal to the preset wait time 142 elapses, the timer 160A outputs a transmission start signal 161 to the transmission control circuit 130. The timer 160A is then reset to its initial state and remains inactive until supplied with a next VPI/VCI detected signal 151. The timer 160A may comprise a combination of an oscillator, a counter, a comparator, and a flip-flop.

If a cell exists in the FIFO memory 120 and the setting 143 indicates the permission of a transmission cycle when the transmission start signal 161 is supplied, then the transmission control circuit 130 reads the transmission cell 121 for one time slot from the FIFO memory 120, and outputs the transmission cell 121 to the transmission line 401. In the event that no cell exists in the FIFO memory 120 or setting 143 indicates the inhibition of a transmission cycle, the transmission control circuit 130 does not operate.

Figure 2:
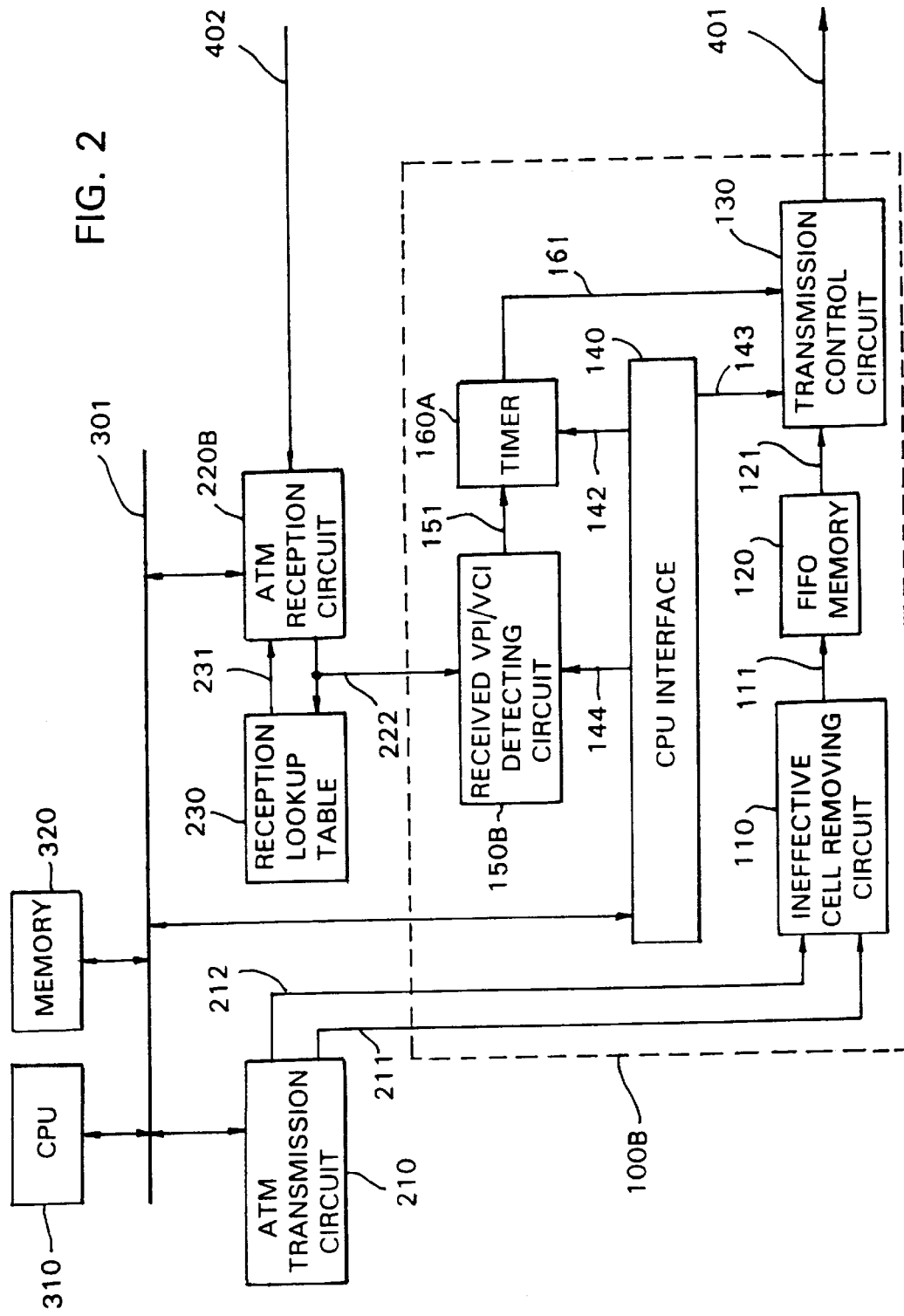
FIG. 2 is a block diagram of a time-division multiplex communication control circuit for an ATM terminal according to a second embodiment of the present invention.

As shown in FIG. 2, a time-division multiplex communication control circuit 100B for an ATM terminal according to a second embodiment of the present invention differs from the time-division multiplex communication control circuit 100A shown in FIG. 1 with respect to an input signal applied to a received VPI/VCI detecting circuit 150B.

The time-division multiplex communication control circuit 100B is used in combination with an ATM reception circuit 220B which addresses an external reception lookup table 230 with a received VPI/VCI. The ATM reception circuit 220B is connected to the CPU interface 140 and an address bus 222 which is connected between the ATM reception circuit 220B and the reception lookup table 230.

The time-division multiplex communication control circuit 100B operates as follows:

The CPU 310 of the terminal establishes, through the CPU interface 140, an address 144 for the reception lookup table 230 which corresponds to a VPI/VCI of a frame synchronizing cell, rather than the VPI/VCI 141 of a frame synchronizing cell in the first embodiment, in the received VPI/VCI detecting circuit 150B.

When the ATM reception circuit 220B receives a cell, it accesses, only once, an address of the reception lookup table 230 which corresponds to the received VPI/VCI. The received VPI/VCI detecting circuit 150B compares the address of the reception lookup table 230 which corresponds to the VPI/VCI of the received cell which is outputted from the ATM reception circuit 220B to the address bus 222 with the preset address of the reception lookup table 230 which corresponds to a VPI/VCI of a frame synchronizing cell. When the compared addresses agree with each other, the ATM reception circuit 220B outputs a VPI/VCI detected signal 151. The ATM reception circuit 220B may comprise a comparator, for example.

In the second embodiment, the value of a VPI/VCI in the header of a received cell is not directly detected, but the access of an address of the reception lookup table 230 which corresponds to the VPI/VCI of the received cell is detected for thereby indirectly detecting the reception of a cell of a certain VPI/VCI.

The time-division multiplex communication control circuit 100B according to the second embodiment is effective in detecting the VPI/VCI of a received cell in an arrangement in which the value of a VPI/VCI of a cell received by the ATM reception circuit 220B is not outputted.

As shown in FIG. 3, a time-division multiplex communication control circuit 100C for an ATM terminal according to a third embodiment of the present invention differs from the time-division multiplex communication control circuit 100A shown in FIG. 1 with respect to a timer 160B, and is arranged to be able to use three time slots in one frame.

The timer 160B is connected to the transmission control circuit 130, the received VPI/VCI detecting circuit 150A, and the CPU interface 140.

Operation of the time-division multiplex communication control circuit 100C will be described below.

The CPU 310 of the terminal establishes, through the CPU interface 140, a wait time 142a from a reference time until a transmission time for a first time slot assigned to the terminal of its own, a wait time 142b until a transmission time for a second time slot, and a wait time 142c until a transmission time for a third time slot, rather than the wait time 142 from the reference time until the transmission time for the time slot assigned to the terminal of its own in the first embodiment, in the timer 160B.

The timer 160B is initially inactive. When supplied with the VPI/VCI detected signal 151, the timer 160B starts measuring time. When a time equal to the preset wait time 142a until the transmission time for the first time slot elapses, the timer 160B outputs a transmission start signal 161 to the transmission control circuit 130. When a time equal to the preset wait time 142b until the transmission time for the second time slot elapses, the timer 160B also outputs a transmission start signal 161 to the transmission control circuit 130. When a time equal to the preset wait time 142c until the transmission time for the third time slot elapses, the timer 160B also outputs a transmission start signal 161 to the transmission control circuit 130. The timer 160B is then reset to its initial state and remains inactive until supplied with a next VPI/VCI detected signal 151. If the wait times 142a, 142b are nil, the timer 160B does not output a transmission start signal 161. Therefore, when a required communication rate can be achieved by a single time slot, the wait times 142a, 142b are set to zero. Since no cell is transmitted in time slots corresponding to these wait times 142a, 142b, those time slots are not wasted and may be assigned to other terminals.

The timer 160B may comprise a combination of an oscillator, a counter, three comparators, and a flip-flop.

The time-division multiplex communication control circuit 100C can use the circuit line efficiently while dynamically varying the number of time slots used depending on a required communication rate through communication with the network host.

Although preferred embodiments of the present invention have been described using specific terms, such description is for illustrative purposes only, and it is to be understood that changes and variations may be made therein without departing from the spirit or scope of the following claims.

What is claimed is:

1. A time-division multiplex communication control circuit for an ATM terminal of an ATM network system which is periodically supplied with a cell of a predetermined VPI/VCI through a reception line from a network host, comprising:

received VPI/VCI detecting means for detecting the reception of the cell by an ATM reception circuit and outputting a VPI/VCI detected signal;

timer means for measuring time from a reference time which represents a time at which said VPI/VCI detected signal is received and outputting a transmitting start signal upon elapse of a predetermined time or a plurality of predetermined times;

ineffective cell removing means for removing an unassigned cell and an idle cell from a transmission cell stream outputted from an ATM transmission circuit and outputting only an effective cell;

FIFO memory means for holding said effective cell outputted from said ineffective cell removing means; and transmission control means for reading the cell from said FIFO memory means and outputting the cell to a transmission line in response to said transmitting start signal.

2. A time-division multiplex communication control circuit according to claim 1, wherein said received VPI/VCI detecting means comprises comparing means for comparing the value of a VPI/VCI in the header of the received cell with the value of a VPI/VCI to be detected, and outputting said VPI/VCI detected signal when the compared values agree with each other.

3. A time-division multiplex communication control circuit according to claim 1, wherein said ATM reception circuit comprises means for referring to an external reception lookup table upon reception of cells, and said received VPI/VCI detecting means comprises comparing means for comparing an address of said reception lookup table which corresponds to the value of a VPI/VCI of the received cell with an address of said reception lookup table which corresponds to the value of a VPI/VCI to be detected, and outputting said VPI/VCI detected signal when the compared addresses agree with each other.

4. A time-division multiplex communication control circuit according to claim 1, wherein the value of a VPI/VCI to be detected by said received VPI/VCI detecting means and a wait time until said timer means outputs said transmission start signal in response to said VPI/VCI detected signal, are software-established by a CPU through a CPU interface.

* * * * *